United States Patent
Li et al.

(10) Patent No.: US 8,681,685 B2
(45) Date of Patent: Mar. 25, 2014

(54) METHOD AND DEVICE IN RSS OF JOINTLY PROCESSING AND A METHOD AND DEVICE IN BSS OF CORRESPONDING PROCESSING

(75) Inventors: Jun Li, Shanghai (CN); Mingli You, Shanghai (CN)

(73) Assignee: Alcatel Lucent, Paris (FR)

( * ) Notice: Subject to any disclaimer, the term of this patent is extended or adjusted under 35 U.S.C. 154(b) by 147 days.

(21) Appl. No.: 13/266,680

(22) PCT Filed: Apr. 28, 2009

(86) PCT No.: PCT/CN2009/000463
§ 371 (c)(1),
(2), (4) Date: Oct. 27, 2011

(87) PCT Pub. No.: WO2010/124419
PCT Pub. Date: Nov. 4, 2010

(65) Prior Publication Data
US 2012/0039244 A1 Feb. 16, 2012

(51) Int. Cl.
*H04B 7/14* (2006.01)
*H04J 1/10* (2006.01)
*H04J 3/08* (2006.01)

(52) U.S. Cl.
USPC ........... 370/315; 370/316; 370/317; 370/319; 455/7; 455/17; 455/20; 455/21; 455/22

(58) Field of Classification Search
USPC ................. 370/241, 242–243, 246–247, 274, 370/315–319; 380/31–43, 255–276; 455/7–25
See application file for complete search history.

(56) References Cited

U.S. PATENT DOCUMENTS

| | | | | |
|---|---|---|---|---|
| 2009/0031200 A1* | 1/2009 | Olaker et al. | | 714/801 |
| 2009/0252146 A1* | 10/2009 | Luo et al. | | 370/351 |
| 2010/0317284 A1* | 12/2010 | Charbit et al. | | 455/7 |
| 2011/0044379 A1* | 2/2011 | Lilleberg et al. | | 375/211 |

FOREIGN PATENT DOCUMENTS

| | | |
|---|---|---|
| CN | 1849768 A | 10/2006 |
| WO | WO2008024158 A1 | 2/2008 |
| WO | WO2008040930 A1 | 4/2008 |

OTHER PUBLICATIONS

International Search Report or PCT/CN2009/000463 dated Feb. 4, 2010.
Wang et al., Complex Field Network Coding for Multiuser Cooperative Communications, IEEE Journal on Selected Areas in Communications, vol. 26, No. 3, Apr. 2008, 11 pp.

* cited by examiner

*Primary Examiner* — Abdullah Riyami
*Assistant Examiner* — Eric Myers
(74) *Attorney, Agent, or Firm* — Fay Sharpe LLP (57) ABSTRACT

According to a detailed embodiment of the invention, the RS implements the following operations by using each of M shift parameter groups: Based on M shift parameters in the group, shifting respectively M decoded bit streams and merge the M shifted bit steams to get a check bit stream. Consequently M check bit streams are obtained by using M shift parameter groups. Then the RS transmits M check bit streams to the BS. The BS has received the M uplink signals from mobile terminals before and makes the M check bit streams as the check information of those uplink signals in order to check them better and reduce error rate. By adopting the method and device proposed by the invention, it is ensured in the low SNR regime error user rate or error block rate is more ideal in multi-user detection in the BS.

21 Claims, 9 Drawing Sheets

$$\pi_{n,m} = \begin{bmatrix} 0 & \cdots & 0 & 1 & 0 & \cdots & 0 \\ 0 & \cdots & 0 & 0 & 1 & \cdots & 0 \\ \vdots & & & & & \ddots & \\ 0 & \cdots & 0 & \cdots & & & 1 \\ 1 & \cdots & 0 & \cdots & & & 0 \\ \vdots & \ddots & \vdots & \cdots & & & \vdots \\ 0 & \cdots & 1 & \cdots & & & 0 \end{bmatrix}$$

Fig. 4

|      | USER1 | USER2 | USER3 | ······ | USER$M$ |
|------|-------|-------|-------|--------|---------|
| RLY1 | 1     | 2     | 3     | ······ | M       |
| RLY2 | 2     | 4     | 6     | ······ | 2M      |
| RLY3 | 3     | 6     | 9     | ······ | 3M      |
| ⋮    | ⋮     | ⋮     | ⋮     | ⋮      | ⋮       |
| RLY$N$ | N   | 2N    | 3N    | ······ | NM      |

METHOD AND DEVICE IN RSS OF JOINTLY PROCESSING AND A METHOD AND DEVICE IN BSS OF CORRESPONDING PROCESSING

TECHNOLOGICAL FIELD

The invention relates to wireless relay network, especially to a method and device, in relay stations (RSs), for jointly processing wireless signals from multiple mobile terminals, and to a method and device, in base stations (BSs), for correspondingly processing of wireless signals from the multiple mobile terminals that is assisted by RSs.

BACKGROUND OF THE ARTS

The wireless relay technology is for improving network capacity and enhancing network coverage. Therefore, the wireless relay is a component of World Interoperability for Microwave Access (WiMAX) networks based on IEEE 802.16 protocol. Meanwhile, many companies propose applying wireless relay technology in long-term evolution (LTE) wireless network networks and further evolution networks using long-term evolution (LTE-Advanced).

Present RSs (Relay Stations) are mainly divided into layer 1 (L1) RS and layer 2 RS. Wherein, L1 RS forwards straight the uplink signals from mobile terminals after receiving them, without decoding. Differently, L2 RS decodes, filters and recodes the uplink signals from mobile terminals, then forwards it to BSs.

The two kinds of RSs have their own advantages and disadvantages by comparison:

L1 RSs needn't equip with codec for not decoding uplink signals. And there is little delay generated in L1 RS. However, there is more noise carried in the forwarded signals, compared to L2 RS.

L2 RSs need equip with codec, for that they need to decode uplink signals. Therefore, there is more cost and more delay generated by encoding and decoding, compared to L1 RS. The advantage of L2 RS is filtering noise in the forwarded signals, which benefits the reception of the signals in BSs.

Suppose a wireless relay network with frequency division multiplex among multi users (see FIG. 1), e.g. LTE-TDD. Wherein, uplink and downlink communications among mobile terminals and BSs adopt time-divided mode.

Figure 1:
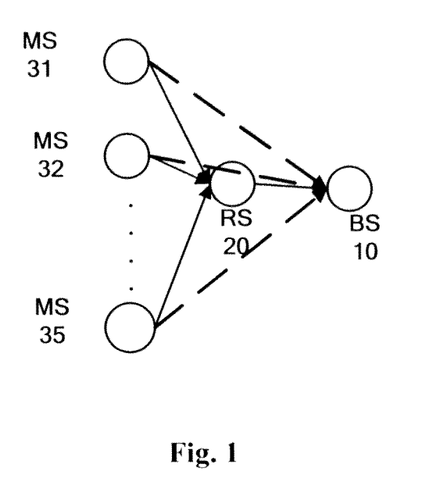
FIG. 1 is atypical schematic diagram of wireless relay network.

Wherein, each mobile terminal 30-35 in the margin of the cell broadcasts its own uplink signal in a different frequency. Those uplink signals not only arrive at the base station (BS or e-Node B) 10, but also at the RS 20.

Then the BS 10 buffers the uplink signals received straight from each mobile terminal. The RS 20 demodulates and decodes each uplink signal, filters noise, encodes and modulates the signal, then transmits it to the BS 10 at orthogonal frequency. Finally, the BS 10 merges the uplink signals received straight from each mobile terminal and forwarded by the RS 20, which leads to getting extra 1-order diversity gain from the RS 20.

But, in this scheme, the RS 20 usually receives the uplink signals from each mobile terminal simultaneously while processes them separately. The 1-order diversity gain above is very limited and not optimal in low SNR case.

IEEE Journal on Selected Areas in Communications, vol. 26, no. 3, April 2008 records <*Complex Field Network Coding for Multiuser Cooperative Communications*>wrote by T. Wang and G. B. Giannakis. Wherein, it proposes merging the uplink signals from multi mobile terminals in symbol of modulation level, in order to get extra joint-process gain. But the scheme has the poor performance in low SNR case.

SUMMARY OF INVENTION

The invention is proposed to solve the above problems in the prior art. According to an embodiment of the invention, a RS demodulates and decodes M uplink signals from M mobile terminals, and uses each of one or more shift parameter groups to implement the following operations: Based on M shift parameters in the group, shifting M decoded bit streams respectively and merging the M shifted bit streams, then obtaining a check bit stream. Hence, N check bit streams are obtained by using the one or more (denoted as N herein) shift parameter groups. Then, the RS transmits the N check bit streams to the BS. The BS has received the M uplink signals from the mobile terminals in advance. Then, the BS can enhance the detection of the uplink signals, by taking the N check bit streams as check information of those uplink signals, in order to reduce error rate. According to at least one embodiment of the invention, the error rate is embodied by user error rate (UER) and block error rate (BLER). Wherein, without loss of generality, the M check bit streams are inter-user parity-check codes, e.g. low density parity check code (LDPC).

According to an embodiment of the invention, N is equal or less than M and equal or more than 1.

According to one aspect of the invention, it is provided a method, used for joint processing, in the RS of wireless relay network, wherein, the method comprises the following steps: Demodulating and decoding respectively multiple paths of uplink signals from multiple mobile terminals, in order to generate multiple decoded bit streams; Based on each one of one or more shift parameter groups, implementing respectively the following operations, wherein, each shift parameter group comprises M shift parameters: Based on M shift parameters in the shift parameter group, shifting M decoded bit streams in the multiple decoded bit streams respectively, in order to generate M shifted bit streams; Merging the M shifted bit streams, in order to generate a check bit stream; Sending to the BS the one or more check bit streams, the check bit streams will be used to process multi-user detection in the BS.

According to another aspect of the invention, it is provided a method, in a BS of wireless relay network, used for processing uplink signals from multiple mobile terminals, wherein, the method comprises the following steps:—obtaining one or more shift parameter groups;

Wherein, the one or multi shift parameter groups are used in the RS to shift process M decoded bit streams in decoded multiple bit streams which are demodulated and decoded from uplink signals of the multi mobile terminals; Still comprises:—Receiving one or more check bit streams transmitted from the RS;—Based on the one or more check bit streams and the one or more shift parameter groups, processing the M paths of uplink signals from the M mobile terminals.

According to yet another aspect of the invention, it is provided a first device of jointly processing in RSs in wireless relay network. Wherein, it comprises demodulator and decoder, for demodulating and decoding respectively multiple paths of uplink signals from multiple mobile terminals in order to generate multiple decoded bit streams; shifting unit and merging unit which based on each one of one or more shift parameter groups implements respectively the following operations, wherein, each shift parameter group comprises M shift parameters: Based on M shift parameters in the shift parameter group, shifting M decoded bit streams in the multiple decoded bit streams respectively, in order to generate M shifted bit streams; Merging the M shifted bit streams in order to generate a check bit stream; transmitter, for sending to the BS the one or more check bit streams, the check bit streams will be used to for multi-user detection in the BS.

According to still another aspect of the invention, it is provided a second device, in BSs in wireless relay network, of processing uplink signals from multiple mobile terminals. Wherein, it comprises obtaining unit for obtaining one or more shift parameter groups; Wherein, the one or multi shift parameter groups are used in the RS to shift process M decoded bit streams in decoded multiple bit streams which are demodulated and decoded from uplink signals of the multi mobile terminals; second receiver, for receiving one or more check bit streams transmitted from the RS; executing unit, based on the one or more check bit streams and the one or more shift parameter groups, processing the M paths of uplink signals from the M mobile terminals.

By adopting the method and device proposed by the invention, it's ensured that relatively ideal error user rate and error block rate for multi-user detection in BSs can be guaranteed in the low SNR case. Besides, it's ensured to reduce network propagation delay on the presumption of acceptable error rate, by flexibly using a few shift parameter groups, i.e. transmitting other information (signals) by using the wireless resources for transmitting check bit streams.

BRIEF DESCRIPTION OF THE DRAWINGS

By reading the detailed description of non-limiting embodiment in conjunction with the drawings, the other features and advantages of the invention will become clearer. Wherein, the same or similar reference signs mean the same or similar features of steps or devices (modules).

DETAILED DESCRIPTION OF THE EMBODIMENT

Figure 2:
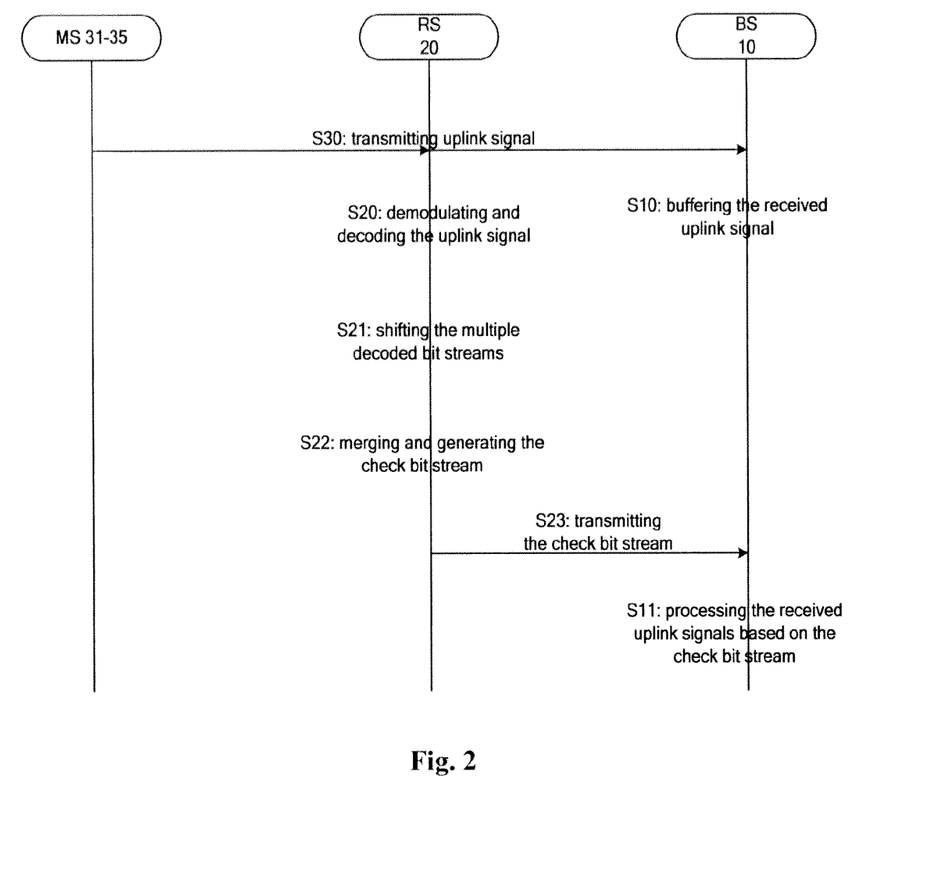
FIG. 2 is a flow diagram of the system method of the joint processing in RSs and the corresponding processing in BSs.

FIG. 2 is a flow diagram of system method used for multi-user detection in wireless communication network according to a detailed embodiment of the invention. The following is the detailed description of the method proposed by the invention referring to FIG. 2 with FIG. 1.

The method begins with S30. Wherein, each of mobile terminals 31-35 transmits one uplink signal respectively in orthogonal frequency. Since the 5 uplink signals are all broadcasted, the RS 20 and BS 10 can receive them. Wherein, it's required that there is a direct or indirect channel between the BS 10 and each mobile terminal, i. e. the BS 10 can receive uplink signals transmitted straight from each mobile terminal or forwarded from another RS which is not shown in FIG. 1. Wherein, the other RS preferably uses different wireless resources from those used by the RS 20 to communicate with the BS 10, e.g. in frequency division or time division multiplex.

There is enough introduction of realization of S30 in the art. The article will not discuss in detail.

In the example, the RS 20 jointly processes 5 uplink signals from mobile terminals 31-35, i.e. M is equal to 5. Those skilled in the field can understand the mobile terminals served by the RS 20 may be more than 5 (mobile terminals 31-35), e.g. 8 in total. But not all those mobile terminals are suitable to be applied with the method of joint processing, provided for RSs by the invention. Then the RS 20 flexibly selects some, e.g. mobile terminals 31-35 that meet preset conditions, to carry out the procedure introduced in detail in the following. They meet the following conditions.

First condition: The frame sizes of the mobile terminals 31-35 meet preset conditions. In detail, the frame sizes are substantially the same. For the one or some with shorter frame size, they may be zero filled at the end of frame and then join the follow-up operation.

Second condition: The mobile terminals 31-35 adopt the same modulation mode, e.g. BPSK or QPSK.

Optimally, the multiple mobile terminals jointly processed by the RS 20 usually are far from the BS 10, such that the quality of uplink signals at the BS 10 is poor, e.g. low SNR and it especially needs extra information provided by the RS 20.

It should be understood that the above selection is not necessary. E.g. the eight mobile terminals temporarily located in the cell administered by the BS 10 are always made the objects that need to be jointly processed by the RS 20, until one moves out of the cell or moves to a location quite near the BS 10.

According to the example, when the RS 20 selects the above mobile terminals, the selection procedure preferably repeats periodically, which may be independent of the method and procedure showed in FIG. 2.

For the 3 paths of uplink signals transmitted from the 3 of 8 mobile terminals except for 31-35, the RS 20 may process them according to the conventional relay mode in L2 RSs, i.e. to demodulate, decode and filter the signals from noise, then to transmit them to the BS at orthogonal frequency after coding and modulating independently. Accordingly, the method that the BS 10 adopts to process the uplink signals from 3 mobile terminals is the same with the prior art. This article will not give unnecessary description. And the followings mainly make an introduction for the mobile terminals 31-35.

Back to the flow diagram in FIG. 2, in S10, the BS buffers the 5 paths of uplink signals from mobile terminals 31-35 after receiving them, and waits for the check information transmitted from the RS 20 in next moment.

Figure 3:
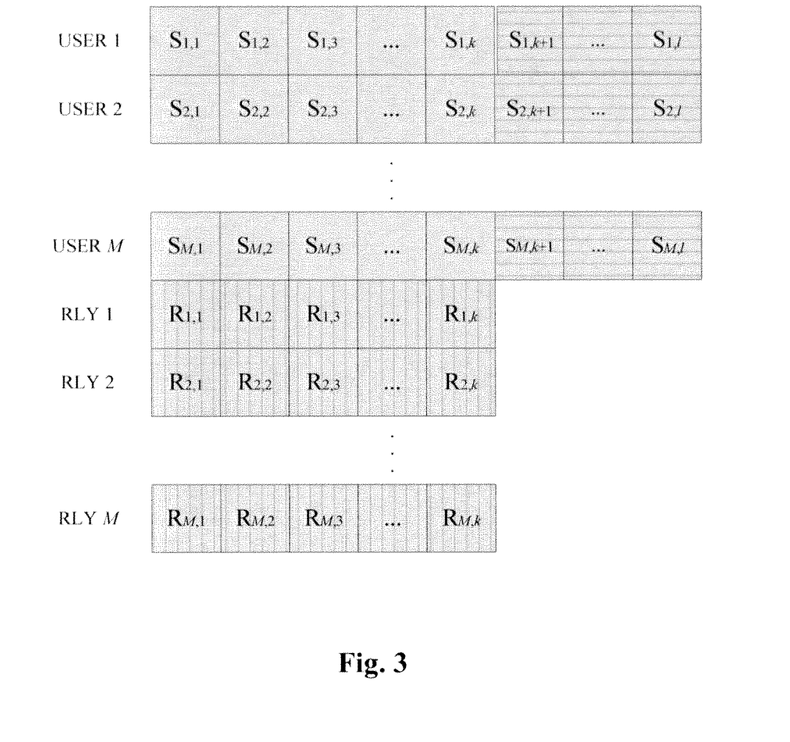
FIG. 3 is a schematic diagram of M bit streams comprising Turbo code redundancy and M bit streams which the relay device forwards.

Equally, the RS 20 demodulates and decodes the 5 paths of uplink signals in S20, to obtain 5 decoded bit streams (see upper half of FIG. 3). Wherein, for more generality, the number of mobile terminals, jointly processed in the RS 20 for multi-user detection in the BS 10, is set to M. Those skilled in the field can understand that the value should be set to 5 in the present embodiment. USER1-USERM correspond respectively to one of M paths of uplink signals transmitted from each mobile terminals, i.e. the decoded bit streams after demodulating and decoding. Wherein, taking User 1 as example, from $U_{1,1}$ to $U_{1,k}$ mean the k decoded original bits, aimed at which the mobile terminal 1 implements channel encoding. While from $U_{1,k+1} \not\leq U_{1,1}$ mean the check information of Turbo code.

The RS transmits M bit streams to the BS after encoding and modulating them (see lower half of FIG. 3). Wherein, taking RLY 1 as an example, in the art there is no difference in the first k bits between RLY 1 and USER 1. I.e. RLY 1=USER 1 and so on. This is because the RS 20 just decodes and forwards (DF) data to get the first order diversity gain. While in at least one embodiment of the invention, the contents of RLY 1-RLY M are different from that, and this condition is realized by S21 and S22 (see FIG. 2). Wherein, for convenience of description of bit streams transmitted by RSs in present technology, as shown in FIG. 3, M bit streams of RLY 1-RLY M are listed, since for the M uplink signals transmitted from M mobile terminals which need joint processing, the number of signals that the RS DFs is M, corresponding to RLY 1-RLY M. While in the invention the number N of check bit streams (denoted by RLY with one sign) obtained by using one or more shift parameter groups is not always equal to M, but than or equal to M.

According to an embodiment of the invention, Galois to Field i.e. network coding scheme is applied. Wherein, in S21 one or more, e.g. 5 shift parameter groups are used for the 5 mobile terminals in the RS 20. Wherein, each shift parameter group comprises 5 (i.e. M described above) shift parameters. And specifically, the following operations are carried out for each shift parameter group: each of decoded bit streams USER1-USER5 is shifted based on the 5 shift parameters, in order to generate 5 shifted bit streams.

Figure 4:
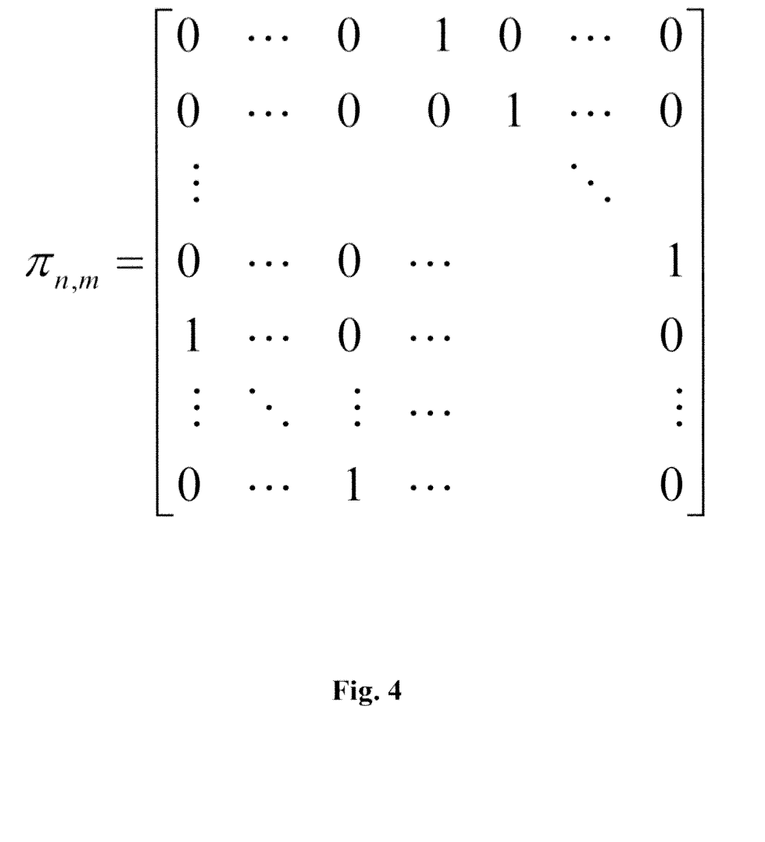
FIG. 4 shows shift parameters according to an embodiment of the invention.

Without loss of generality, one shift parameter above is showed in FIG. 4. Wherein, n is the index of the shift parameter groups, and m indicates this shift parameter in the parameter group is corresponding to which mobile terminals (or decoded bit streams). In the example, as described above, the value ranges of n and m are positive integers of 1-5, i.e. N=M=5.

In the universal shift matrix (i.e. shift parameters) of shift parameters, there are M columns and M rows (see FIG. 4). Wherein, "1"s of each row are all in the n*mth column and "1" of the second row is in (n*m+1)th column and so on. Wherein, the shift parameter may be realized by a shift register.

The step S21 is also showed as the following:

$$e_{n,m} = f_{n,m}(USER_m)$$

n=1...N m=1...M  (1)

Wherein, N is the number of shift parameter groups. $f_{n,m}$ (USER$_m$) means left cycle shifting n×m bits of the mth decoded bit streams USER$_m$, by using the mth shift parameter in the nth shift parameter group. $e_{m,n}$ is the shifted bit stream obtained from shifting the USER$_n$.

Obviously, preferably, each shift parameter group should be different with each other, when using multiple shift parameter groups. It is actually ensured that different shifted bit streams are obtained after shifting the same decoded bit streams by using each shift parameter group. If multiple shift parameter groups are the same, the same M (i.e. 5) check bit streams are obtained after merging in the following S22, which has the same meaning as only one check bit stream for the BS 10.

Figure 5:
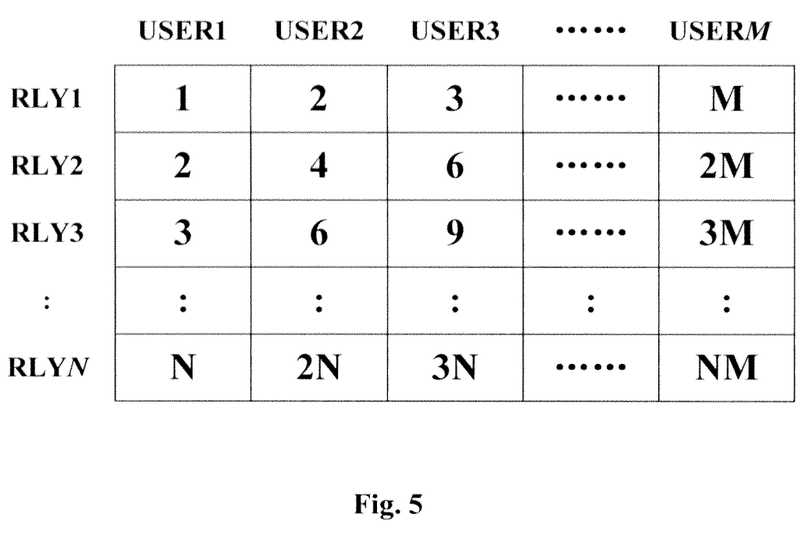
FIG. 5 is a schematic diagram of the shift mode according to an embodiment of the invention.

According to FIG. 4 and formula (1), a shift mode is obtained as showed in FIG. 5. Wherein, the row is corresponding to a shift parameter group and to a check bit stream generated finally. The column is corresponding to a shift parameter of the shift parameter group, and to a specific mobile terminal and a decoded bit stream. Each element in the table is the number of bits by which the bit stream is left cycle shifted under the action of a certain shift parameter of a certain shift parameter group.

Though the article makes an introduction of an example of shift parameter groups and shift parameters according to FIG. 4 and formula (1) those skilled in the field can implement the shift operation in S21 to obtain N different or substantially different check bit streams, by using shift parameter groups and shift parameters in other forms without any creative work according to the teaching of the article. Wherein, the check bit streams substantially different mean the decoded bit streams, merged in S22 after shifted by two different shift parameter groups, generate two check bit streams which are the same in form by chance.

Preferably, it should be ensured by shift parameters that there is no girth 4 circle in Tyner diagram which is corresponding to network coded parity-check matrix. Otherwise it will reduce decoder performance, according to the decode theory.

According to the invention, the check information of Turbo code showed in FIG. 3 may be involved or not in the shift operation described in the following. Without loss of generality, the introduction will not involve the check information of Turbo code in the shift operation.

According to the invention, advantageously, the RS 20 just needs to know how many mobile terminals will be in S21, i.e. data (signals or information) of how many mobile terminals the RS20 will jointly process to provide check bit streams to the BS 10. Then each shift parameter group will be obtained simply. This is because the number of mobile terminals is the M mentioned in context again and again.

In order to make the BS 10 analyze correctly the check bit streams provided by the PS 20, the invention proposes many modes of realization.

1. The functionality of determining shift parameters, same with that of the RS 20, is provided to the BS 10. I.e. the BS 10 just needs to know how many mobile terminals the RS 20 jointly processes with step S20-S21, then obtains the shift parameters which are similar but not limited as showed in FIG. 4.
2. The RS 20 reports in dedicated control channels to the BS 10 the shift parameters, e.g. it transmits the matrix showed in FIG. 4. Wherein, the BS 10 receives the notice for parameter groups from the RS 20, and extracts each parameter group needed. Surely, since the method needs to transmit matrixes, the overheads of signaling are more.

Those skilled in the field may select one from the two methods above, according to their needs during actual realization of the invention.

Alternatively, the RS 20 may merge each shifted bit streams to one check bit stream in S22, after obtaining 5 shifted bit streams by using 5 groups of shift parameters in S21. The RS 20 may also merge 5 decoded bit streams in S22 after they are shifted by using one group of shift parameters in S21, then use another group of shift parameters to repeat above operations until obtaining 5 check bit streams. Surely in any time the description of this article should not be understood as that the operation mode of S21 and S22 is limited by the invention.

The following is an introduction of 322. According to a detailed embodiment of the invention, the RS 20 implements exclusive or to the 5 shifted bit streams obtained from each group of shift parameters to generate a check bit stream. The procedure is well shown in formula (2).

$$RLYn = \Pi_{n,1}USER1 \oplus \Pi_{n,2}USER2 \oplus \ldots \oplus \Pi_{n,m}USERm(n=1,\ldots,N) \quad (2)$$

Wherein, RLY n is the check bit stream obtained by implementing exclusive or to M shifted bit streams by using the nth shift parameter group. And each of $\Pi_{n,1}$USER 1, $\Pi_{n,2}$USER 2, ..., $\Pi_{n,m}$USER m is $e_{n,m}$ shown in formula (1).

It can be seen that, in every bit stream obtained finally in S22, each bit represents a result of parity check. Wherein, multiple bit streams participate in exclusive or are obtained from cycle shift. Consequently if the BS 10 knows the shift mode used by the RS 20, it will know each check bit of each check bit stream is the obtained check result of which bit of the original decoded bit streams.

The RS 20 transmits 5 check bit streams generated to the BS 10 in the following S23, for assisting multi-user detection in BS 10. In the example, N=M=5, i.e. 5 groups of shifted bit streams are obtained by using 5 shift parameter groups, and each group is merged into one check bit stream and finally 5 check bit streams are obtained. Then it's better ensured less error probability when the BS 10 processes the 5 paths of uplink signals. Optionally, N may be less than M, i.e. the RS 20 may implement above operations by using 1 to 4 shift parameter groups. Then 1 to 4 check bit streams are provided to the BS 10. Compared to N=M case, this reducing check bit streams sacrifices some error rate (i.e. the error rate is higher). But some wireless resources are saved and may be allocated by BSs or RSs, so as to increase system transmission rate and reduce network delay.

Since the generation mode of check bit streams in the RS in the example is an encode mode of low density parity check (LDPC), after receiving the 5 check bit streams from the RS 20, the BS 10 LDPC decodes the 5 uplink signals buffered in S10 based on the 5 check bit streams. The final output LLR (log-likelihood ratio) value can be used as either decision value or the input of Turbo decoder. Wherein, in the example it is not considered as the input of Turbo decoder.

Surely, when N is less than 5, the BS 10 can only receive less than 5 check bit streams. But this doesn't essentially affect the decoding above in the BS, at most leads to higher error probability compared to the situation of 5 check bit streams.

Figure 6:
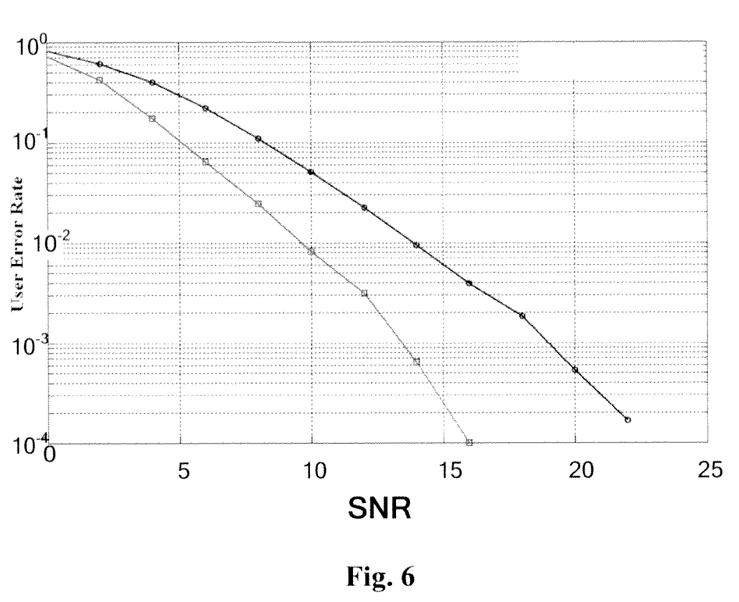
FIG. 6 is a comparative diagram of simulation results of error user rate between the embodiment of the invention and the prior art.

FIG. 6 is the comparing diagram of simulation results of error user rate between the embodiment of the invention and the prior art.

Figure 7:
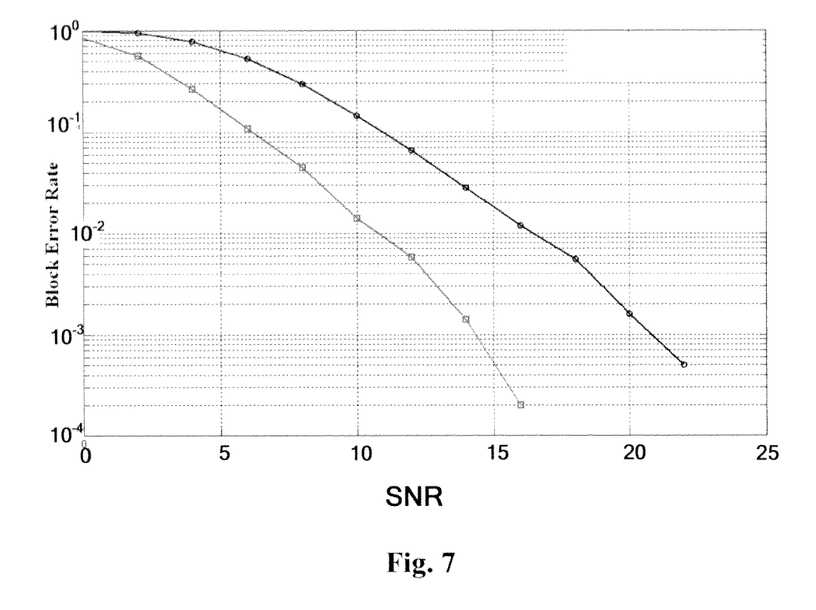
FIG. 7 is a comparative diagram of simulation results of error block rate between the embodiment of the invention and the prior art.

FIG. 7 is the comparing diagram of simulation results of error block rate between the embodiment of the invention and the prior art. Wherein, a block is comprised of multiple frames from multi mobile terminals. The simulation environment is as the following:

There are one BS, one RS and 3 mobile terminals in the network (all participate in the procedure showed in FIG. 2).

The result of LLR output is made the decision value directly, without inputting the result into Turbo encoder.

All channels distribute independently by Rayleigh fading without consideration of loss of transmission path.

Three mobile terminals all apply BPSK modulation

The uplink frames of three mobile terminals are all 100 modulation symbols

Wherein, the upper curve in each diagram is variation curve of error user (block) rate vs. SNR based on the invention. The lower curve in each diagram is variation curve of error user (block) rate vs. SNR based on the present mode. Obviously there is clear superiority in the invention.

Figure 8:
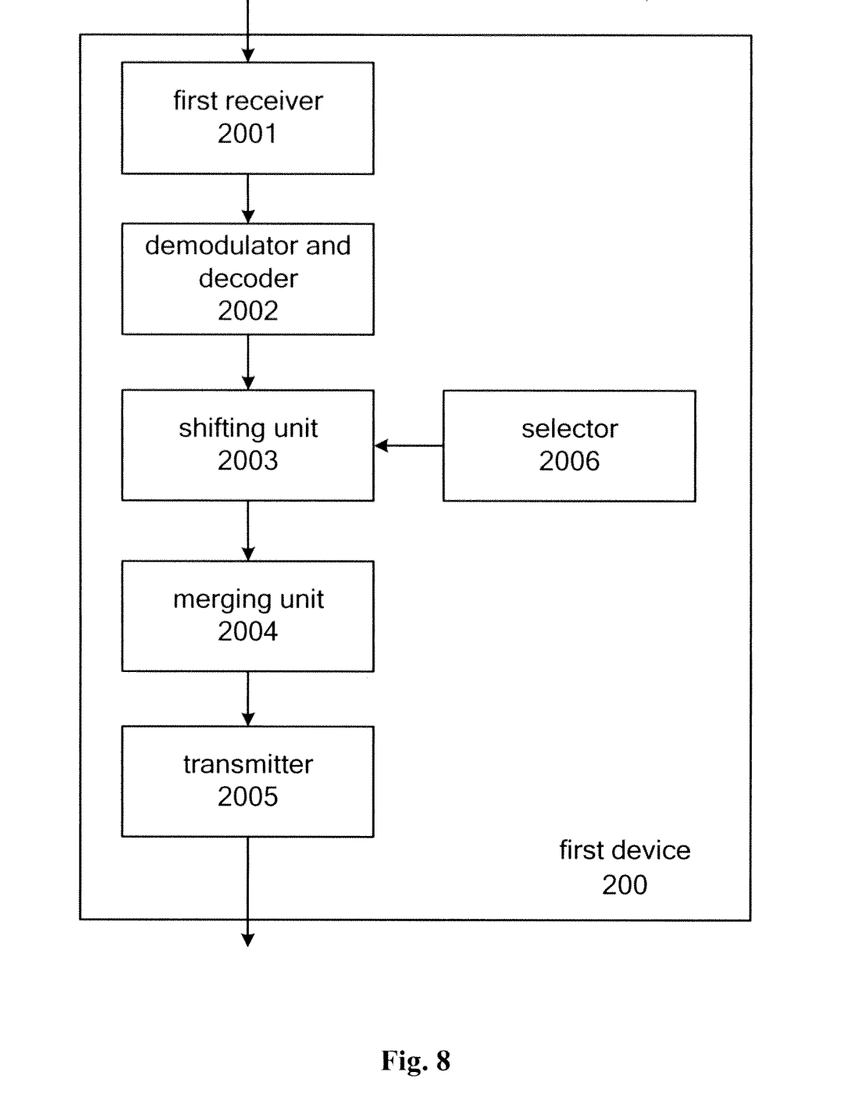
FIG. 8 is a block diagram of the first device for jointly processing in RSs, according to an embodiment of the invention.
Figure 9:
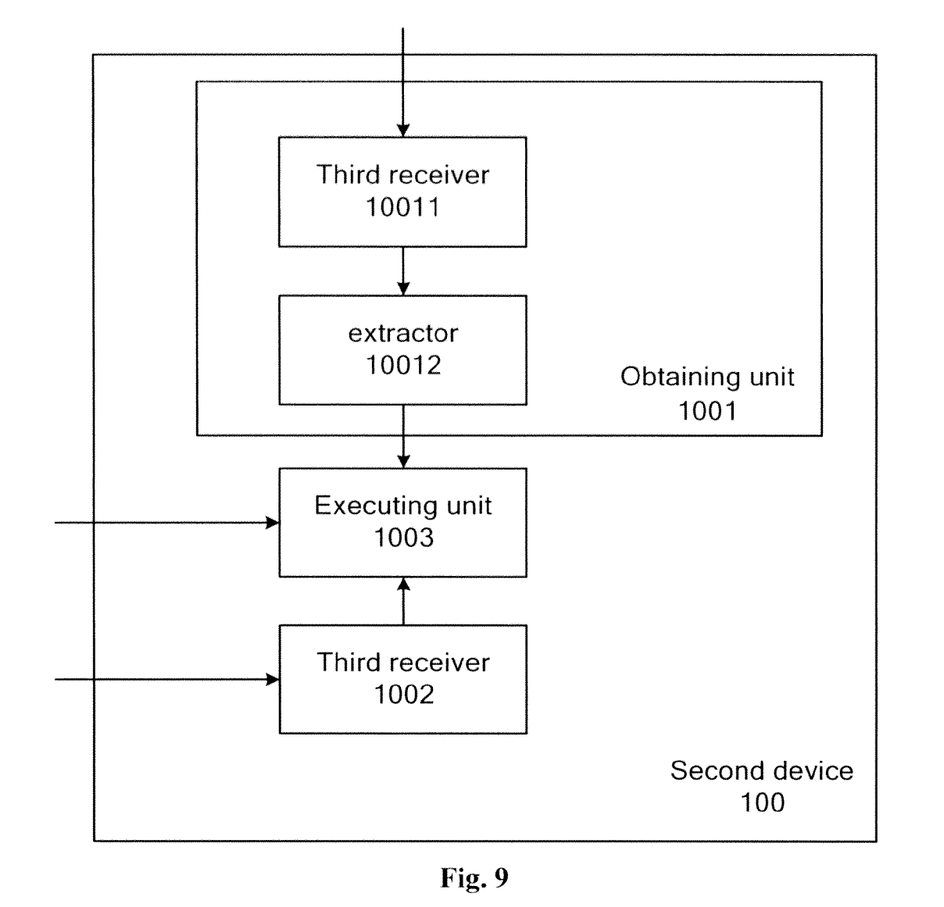
FIG. 9 is a block diagram of the second device for processing uplink signals from multiple mobile terminals in BSs, according to an embodiment of the invention.

The following introduce each devices provided by the invention, by referring to device block diagram in conjunction with other drawings. Wherein, FIG. 8 is a block diagram of the first device for jointly processing in RSs, according to an embodiment of the invention. And FIG. 9 is a block diagram of the second device for processing uplink signals from multiple mobile terminals in BSs, according to an embodiment of the invention.

Wherein, the shown first device 200 comprises the first receiver 2001, demodulator and decoder 2002, shifting unit 2003, merging unit 2004, transmitter 2005 and selector 2006. The shown second device comprises obtaining unit 1001, the second receiver 1002 and execution unit 1003. In detail, the obtaining unit 1001 comprises the third receiver 10011 and extractor 10012.

Each of mobile terminals 31-35 respectively transmits one uplink signal in orthogonal frequency. Since the 5 uplink signals are all broadcasted, the RS 20 and BS 10 can receive them. Wherein, it's required that there is a direct or indirect channel between the BS 10 and each mobile terminal, i. e. the BS 10 can receive uplink signals transmitted straight from each mobile terminal or forwarded from another RS which is not shown in FIG. 1. Wherein, the other RS preferably uses different wireless resources from those used by the RS 20 to communicate with the BS 10, e.g. in frequency division or time division multiplex.

There is enough introduction of realization of transmitting procedure of above uplink signals. The article will not discuss in detail. Those uplink signals will be received respectively by the first receiver 2001 in RS 20 and the second receiver 1002 in BS 21.

In the example, the first device in the RS 20 jointly processes 5 uplink signals from mobile terminals 31-35, i.e. M is equal to 5. Those skilled in the field can understand the mobile terminals served by the RS 20 may be more than 5 (mobile terminals 31-35) e.g. 8 in total. But not all those mobile terminals are suitable to be applied with the method of joint processing, provided for RSs by the invention. Then the RS 20 flexibly selects some, e.g. mobile terminals 31-35 that meet preset conditions, to carry out the procedure introduced in detail in the following. They meet the following conditions.

First condition: The frame sizes of the mobile terminals 31-35 meet preset conditions. In detail, the frame sizes are substantially the same. For the one or some with shorter frame size, they may be zero filled at the end of frame and then join the follow-up operation.

Second condition: The mobile terminals 31-35 adopt the same modulation mode, e.g. BPSK or QPSK.

Optimally, the multiple mobile terminals jointly processed by the RS 20 usually are far from the BS 10, such that the quality of uplink signals at the BS 10 is poor, e.g. low SNR and it especially needs extra information provided by the RS 20.

It should be understood that the above selection is not necessary. E.g. the eight mobile terminals temporarily located in the cell administerred by the BS 10 are always made the objects that need to be jointly processed by the RS 20, until one of the mobile terminals moves out of the cell or moves to a location quite near the BS 10.

According to the example, when the RS 20 selects the above mobile terminals, the selection procedure preferably repeats periodically, which may be independent of the method and procedure showed in FIG. 2.

For the 3 paths of uplink signals transmitted from the 3 of 8 mobile terminals except for 31-35, the RS 20 may process them according to the conventional relay mode in L2 RSs, i.e. to demodulate, decode and filter the signals from noise, then to transmit them to the BS at orthogonal frequency after coding and modulating independently. Accordingly, the method that the BS 10 adopts to process the uplink signals from 3 mobile terminals is the same with the prior art. This article will not give unnecessary description. And the followings mainly make an introduction for the mobile terminals 31-35.

The corresponding functional module (not showing in the diagram) of the BS 10 buffers the 5 paths of uplink signals from mobile terminals 31-35 after receiving them, and waits for the check information transmitted from the RS 20 in next moment.

As to the RS20, it demodulates and decodes the 5 paths of uplink signals by using the demodulator and decoder 2002 in the first device 200 (i.e. implementing the S20 showed in FIG. 2), to obtain 5 paths of decoded bit streams (see upper half of FIG. 3). Wherein, for more generality, the number of mobile terminals, jointly processed in the RS 20 for multi-user detection in the BS 10, is set to M. Those skilled in the field can understand that the value should be set to 5 in the present embodiment. USER1-USERM correspond respectively to one of M paths of uplink signals transmitted from each mobile terminals, i.e. the decoded bit streams after demodulating and decoding. Wherein, taking User 1 as example, from $U_{1,1}$ to $U_{1,k}$ mean the k decoded original bits, aimed at which the mobile terminal 1 implements channel encoding. While from $U_{1,k+1}$ ≨ $U_{1,1}$ mean the check information of Turbo code.

The RS transmits M bit streams to the BS after encoding and modulating them (see lower half of FIG. 3). Wherein, taking RLY 1 as example, in the prior art, there is no difference in the first k bits between RLY 1 and USER 1. I.e. RLY 1=USER 1 and so on. This is because the RS 20 just decodes and forwards (DF) data to get the first order diversity gain.

According to an embodiment of the invention, Galois Field i.e. network coding scheme is applied. Wherein, one or more, e.g. 5 shift parameter groups are used for the 5 mobile terminals by shifting unit 2003 in the RS 20. Wherein, each shift parameter group comprises 5 (i.e. M described above) shift parameters. And specifically, the following operations are carried out for each shift parameter group: each of decoded bit streams USER1-USER5 is shifted based on the 5 shift parameters, in order to generate 5 shifted bit streams.

Without loss of generality, one shift parameter above is showed in FIG. 4. Wherein, n is the index of the shift parameter groups, and m indicates this shift parameter in the parameter group is corresponding to which mobile terminals (or decoded bit streams). In the example, as described above, the value ranges of n and m are positive integers of 1-5, i.e. N=M=5.

In the universal shift matrix (i.e. shift parameters) of shift parameters, there are M columns and M rows (see FIG. 4). Wherein, "1"s of each row are all in the n*mth column and "1" of the second row is in (n*m+1)th column and so on. Wherein, the shift parameter may be realized by a shift register.

The function of the shifting unit 2003 can also be expressed by the above formula (1):

Wherein, N is the number of shift parameter groups. $f_{n,m}$ (USER$_m$) means left cycle shifting n×m bits of the mth decoded bit streams USER$_m$, by using the mth shift parameter in the nth shift parameter group. $e_{m,n}$ is the shifted bit stream obtained from shifting the USER$_n$.

Obviously, preferably, each shift parameter group should be different with each other, when using multiple shift parameter groups. It is actually ensured that different shifted bit streams are obtained after shifting the same decoded bit streams by using each shift parameter group. If multiple shift parameter groups are the same, the same M (i.e. 5) check bit streams are obtained after merging in the following S22, which has the same meaning as only one check bit stream for the BS 10.

According to FIG. 4 and formula (1), a shift mode is obtained as showed in FIG. 5. Wherein, the row is corresponding to a shift parameter group and to a check bit stream generated finally. The column is corresponding to a shift parameter of the shift parameter group, and to a specific mobile terminal and a decoded bit stream. Each element in the table is the number of bits by which the bit stream is left cycle shifted under the action of a certain shift parameter of a certain shift parameter group.

Though the article makes an introduction of an example of shift parameter groups and shift parameters according to FIG. 4 and formula (1), those skilled in the field can implement the shift operation of shifting unit 2003 to obtain N different or substantially different check bit streams, by using shift parameter groups and shift parameters in other forms without any creative work according to the teaching of the article. Wherein, the check bit streams substantially different mean the decoded bit streams, merged in merging unit 2004 after shifted by two different shift parameter groups, generate two check bit streams which are the same in form by chance.

Preferably, it should be ensured by shift parameters that there is no girth 4 circle based on network coded parity-check matrix. Otherwise it will reduce decoder performance, according to the decode theory.

According to the invention, the check information of Turbo code showed in FIG. 3 may be involved or not in the shift operation described in the following. Without loss of generality, the introduction will not involve the check information of Turbo code in the shift operation.

According to the invention, advantageously, the RS 20 just needs to know how many mobile terminals will be in operations of shifting unit 2003, i.e. data (signals or information) of how many mobile terminals the RS20 will jointly process to provide check bit streams to the BS 10. Then each shift parameter group will be obtained simply. This is because the number of mobile terminals is the M mentioned in context again and again.

In order to make the BS 10 analyze correctly the check bit streams provided by the RS 20, the invention proposes many modes of realization.

1. The functionality of determining shift parameters, same with that of the RS 20, is provided to the BS 10. I.e. the BS 10 just needs to know how many mobile terminals the RS 20 jointly processes with shifting unit 2003 and merging unit 2004, then it can obtain the shift parameters which are similar but not limited as showed in FIG. 4.

2. The RS 20 reports in dedicated control channels to the BS 10 the shift parameters, e.g. it transmits the matrix showed in FIG. 4. Wherein, the third receiver 10011 of the obtaining unit 1001 receives the notice for parameter groups from the RS 20 and supplies it to the extractor 10012, and the later extracts each parameter group needed. Surely, since the method needs to transmit matrixes, the overheads of signaling are more.

Those skilled in the field may select one from the two methods above, according to their needs during actual realization of the invention.

Alternatively, the RS 20 may merge each shifted bit streams to one check bit stream with merging unit 2004, after obtaining 5 shifted bit streams by using 5 groups of shift parameters with shifting unit 2003. The RS 20 may also merge 5 decoded bit streams with merging unit 2004 after they are shifted by using one group of shift parameters with shifting unit 2003, then uses another group of shift parameters to repeat above operations until obtaining 5 check bit streams. Surely, in any time, the description of this article should not be understood as that the operation mode of shifting unit 2003 and merging unit 2004 is limited by the invention.

The following is an introduction of the operation of the merging unit 2004. According to a detailed embodiment of the invention, the RS 20 implements exclusive or to the 5 shifted bit streams obtained from each group of shift parameters to generate a check bit stream. The procedure is well shown in formula (2).

Wherein, RLY n is the check bit stream obtained by implementing exclusive or to M shifted bit streams by using the nth shift parameter group. And each of $\Pi_{n,1}$USER 1, $\Pi_{n,2}$USER 2, ..., $\Pi_{n,m}$USER m is $e_{n,m}$ shown in formula (1).

It can be seen that, in every bit stream obtained finally in merging unit 2004, each bit represents a result of parity check. Wherein, multiple bit streams participate in exclusive or are obtained from cycle shift. Consequently if the BS 10 knows the shift mode used by the RS 20, it will know each check bit of each check bit stream is the obtained check result of which bit of the original decoded bit streams.

The RS 20 transmits 5 check bit streams generated to the BS 10 by using the transmitter 2005, for assisting multi-user detection in BS 10.

In the example, N=M=5, i.e. 5 groups of shifted bit streams are obtained by using 5 shift parameter groups, and each group is merged into one check bit stream and finally 5 check bit streams are obtained. Then it better ensured less error probability when the BS 10 processes the 5 paths of uplink signals. Optionally, N may be less than M, i.e. the RS 20 may implement above operations by using 1 to 4 shift parameter groups. Then 1 to 4 check bit streams are provided to the BS 10. Compared to N=M case, this reducing check bit streams sacrifices some error rate (i.e. the error rate is higher). But some wireless resources are saved and may be allocated by BSs or RSs, so as to increase system transmission rate and reduce network delay.

Since the generation mode of check bit streams in the RS in the example is an encode mode of low density parity check (LDPC), by using the executing device 1003 the BS 10 LDPC decodes the 5 uplink signals saved after receiving the 5 check bit streams from the PS 20. The final output LLR (log-likelihood ratio) value can be used as either decision value or the input of Turbo decoder. Wherein, in the example it is not considered as the input of Turbo decoder.

It needs to understand that the invention is not confined to the specific embodiment described above.

It should be understood that the invention is not confined to the specific embodiment described above.

What is claimed is:

1. A method, of processing uplink signals from multiple mobile terminals, comprising:
   demodulating and decoding uplink signals from M mobile terminals at a relay station (RS) of a wireless network to form M respective decoded bit streams;
   generating one or more (N) check bit streams from the M decoded bit streams based on a shift parameter group (n) for each respective check bit stream (n), wherein each shift parameter group (n) comprises M shift parameters, the generating for each check bit stream (n) comprising:
   shifting each of the M decoded bit streams based on the respective M shift parameters in the corresponding shift parameter group (n) to form M shifted bit streams; and
   merging the M shifted bit streams to form the respective check bit stream (n); and
   sending the one or more (N) check bit streams from the RS to a base station (BS).

2. The method according to claim 1, further comprising:
   selecting the M mobile terminals from multiple mobile terminals served by the RS based at least in part on the M mobile terminals meeting preset conditions.

3. The method according to claim 2, wherein the preset conditions include frame length and modulation scheme, the method further comprising:
   selecting the M mobile terminals from the multiple mobile terminals based at least in part on the frame length and the modulation scheme used by the M mobile terminals.

4. The method according to claim 1, wherein the shifting associated with generating the respective check bit stream (n) is implemented using the following algorithm:

$$e_{n,m} = f_{n,m}(\text{USER}_m)$$

$$n = 1 \ldots N$$

$$m = 1 \ldots M$$

where N is the quantity of shift parameter groups, M is the quantity of shift parameters, USER$_m$, is the decoded bit stream for the m$^{th}$ shift parameter, $f_{n\ m}$(USER$_m$) uses the m$^{th}$ shift parameter in the n$^{th}$ shift parameter group to perform a left circular shift by n×m bits on USER$_m$ to form the corresponding shifted bit stream ($e_{n,m}$) for the n$^{th}$ shift parameter group and the m$^{th}$ shift parameter.

5. The method according to claim 1, the generating for each check bit stream (n) further comprising:
   processing the M shifted bit streams using an exclusive OR algorithm in conjunction with the merginq to form the respective check bit stream (n).

6. The method according to claim 1, wherein
   the uplink signals are transmitted from the M mobile terminals using orthogonal frequencies.

7. The method according to claim 1, wherein the one or more (N) check bit streams facilitate BS processing of at least one other path of the uplink signals from the M mobile terminals to the BS.

8. The method according to claim 1, further comprising:
   sending a notice message from the RS to the BS, wherein the notice message comprises the one or more (N) shift parameter groups for use by the BS in conjunction with BS processing of at least one other path of the uplink signals from the M mobile terminals to the BS.

9. A method of processing uplink signals from multiple mobile terminals, comprising:
   obtaining one or more (N) shift parameter groups at a base station (BS) of a wireless network for use in conjunction with processing uplink signals from M mobile terminals, wherein each shift parameter group (n) comprises M shift parameters;
   receiving one or more (N) check bit streams from a relay station (RS) of the wireless network, each check bit stream (n) generated by the RS from M decoded bit streams based on a respective shift parameter group (n) of the one or more (N) shift parameter groups wherein the RS forms the M decoded bit streams by demodulating and decoding uplink signals from the M mobile terminals, wherein the RS generates each check bit stream (n) using a shift process to shift each of the M decoded bit streams based on the respective M shift parameters in the corresponding shift parameter group (n) to form M shifted bit streams and merges the M shifted bit streams to form the respective check bit stream (n);

receiving uplink signals from the M mobile terminals at the BS; and processing the uplink signals at the BS based on the one or more (N) check bit streams and the one or more (N) shift parameter groups.

10. The method according to claim 9, wherein, further comprising:

receiving a notice message from the RS at the BS in conjunction with the obtaining, wherein the notice message comprises the one or more (N) shift parameter groups; and extracting the one or more (N) shift parameter groups from the notice message in conjunction with the obtaining.

11. The method according to claim 9, further comprising:
selecting the M mobile terminals from multiple mobile terminals served by the BS based at least in part on the M mobile terminals meeting preset conditions.

12. The method according to claim 9, wherein the uplink signals are transmitted from the M mobile terminals using orthogonal frequencies.

13. An apparatus for processing uplink signals from multiple mobile terminals, the apparatus comprising:

a receiver configured to receive uplink signals from M mobile terminals in a wireless network;

a demodulator/decoder configured to demodulate and decode the uplink signals from the M mobile terminals to form M respective decoded bit streams;

a bit stream processor configured to generate one or more (N) check bit streams from the M decoded bit streams based on a shift parameter group (n) for each respective check bit stream (n), wherein each shift parameter group (n) comprises M shift parameters, the bit stream processor comprising:

a shifting sub-processor configured to shift each of the M decoded bit streams based on the respective M shift parameters in the corresponding Shift parameter group (n) to from M shifted bit streams for each check bit stream (n); and a merging sub-processor configured to merg the M shifted bit streams from the respective check bit stream (n)for each check bit stream (n); and a transmitter configured to send the one or more (N) check bit streams to a base station (BS).

14. A relay station in the wireless network, the relay station comprising:

the apparatus according to claim 13.

15. The apparatus according to claim 13, the bit stream processor further comprising:

a selector sub-processor configured to select the M mobile terminals from multiple mobile terminals served by the apparatus based at least in part on the M mobile terminals meeting preset conditions.

16. The apparatus according to claim 13, wherein the wireless network is a long-term evolution network, a WiMAX network, or a further evolution network of long-term evolution.

17. The apparatus according to claim 13 wherein the transmitter is configured to send a notice message to the BS, wherein the notice message comprises the one or more (N) shift parameter groups for use by the BS in conjunction with BS processing of at least one other path of the uplink signals from the M mobile terminals to the BS.

18. An apparatus for processing uplink signals from multiple mobile terminals, the apparatus comprising:

an obtaining processor configured to obtain one or more (N) shift parameter groups for use in conjunction with processing uplink signals from M mobile terminals, wherein each shift parameter group (n) comprises M shift parameters;

a bit stream processor configured to receive one or more (N) check bit streams from a relay station (RS) of a wireless network, each check bit stream (n) generated by the RS from M decoded bit streams based on a respective shift parameter group (n) of the one or more (N) shift parameter groups, wherein the RS forms the M decoded bit streams by demodulating and decoding uplink signals from the M mobile terminals, wherein the RS generates each check bit stream (n) using a shift process to shift each of the M decoded bit streams based on the respective M shift parameters in the corresponding shift parameter group (n) to form M shifted bit streams and merges the M shifted bit streams to form the respective check bit stream (n); and a receiver configured to receive uplink signals from the M mobile terminals wherein the bit stream processor is configured to process the uplink signals based on the one or more (N) check bit streams and the one or more (N) shift parameter groups.

19. A base station in the wireless network, the base station comprising:

the apparatus according to claim 18.

20. The apparatus according to claim 18, wherein the obtaining processor is configured to receive a notice message from the RS, wherein the notice message comprises the one or more (N) shift parameter groups and the obtaining processor configured to extract the one or more (N) shift parameter groups from the notice message.

21. The apparatus according to claim 18, wherein the wireless network is a long-term evolution network, a WiMAX network, or a further evolution network of long-term evolution.

* * * * *